(12) United States Patent
Mak

(10) Patent No.: US 10,150,926 B2
(45) Date of Patent: Dec. 11, 2018

(54) CONFIGURATIONS AND METHODS OF FLEXIBLE CO2 REMOVAL

(71) Applicant: Fluor Technologies Corporation, Sugar Land, TX (US)

(72) Inventor: John Mak, Santa Ana, CA (US)

(73) Assignee: Fluor Technologies Corporation, Sugar Land, TX (US)

( * ) Notice: Subject to any disclaimer, the term of this patent is extended or adjusted under 35 U.S.C. 154(b) by 0 days.

(21) Appl. No.: 15/901,585

(22) Filed: Feb. 21, 2018

(65) Prior Publication Data

US 2018/0179460 A1 Jun. 28, 2018

Related U.S. Application Data

(62) Division of application No. 14/569,268, filed on Dec. 12, 2014, now Pat. No. 10,000,713.

(Continued)

(51) Int. Cl.
*B01D 53/14* (2006.01)
*B01D 53/18* (2006.01)
(Continued)

(52) U.S. Cl.
CPC .......... *C10L 3/104* (2013.01); *B01D 53/1406* (2013.01); *B01D 53/1425* (2013.01);
(Continued)

(58) Field of Classification Search
CPC ........ B01D 2252/20; B01D 2252/2025; B01D 2252/2026; B01D 2252/20468;
(Continued)

(56) References Cited

U.S. PATENT DOCUMENTS 2,177,068 A 10/1939 Hutchinson et al.
2,649,166 A 8/1953 Frank et al.
(Continued)

FOREIGN PATENT DOCUMENTS

AU 2010346469 A1 8/2012
CA 2787146 A1 8/2011
(Continued)

OTHER PUBLICATIONS

PCT Application No. PCT/US2006/014710, International Search Report and Written Opinion, dated Sep. 6, 2006.
(Continued)

*Primary Examiner* — Cabrena Holecek
(74) *Attorney, Agent, or Firm* — Conley Rose, PC

(57) ABSTRACT

A plant comprises a feed gas source, H2S removal unit, first absorber and a second, pressure reduction stages, first and second heat exchangers, stripping unit, and a conduit. The H2S removal unit selectively removes H2S from a feed gas from the feed gas source to produce an H2S depleted feed gas. The first absorber and the second absorber remove CO2 from the H2S depleted feed gas using a semi-lean and an ultralean solvent to produce a product gas and a rich solvent. The plurality of pressure reduction stages generates a cooled flashed solvent. The first heat exchanger and the second heat exchanger use the cooled flashed solvent to cool the H2S depleted feed gas and the semi-lean solvent. The stripping unit strips the flashed solvent with dried air to produce the ultralean solvent, and the conduit combines a portion of the ultralean solvent with the H2S depleted feed gas.

20 Claims, 3 Drawing Sheets

Related U.S. Application Data

(60) Provisional application No. 61/915,173, filed on Dec. 12, 2013.

(51) Int. Cl.
*C10L 10/04* (2006.01)
*C10L 3/10* (2006.01)

(52) U.S. Cl.
CPC ..... *B01D 53/1431* (2013.01); *B01D 53/1475* (2013.01); *C10L 3/103* (2013.01); *B01D 53/1493* (2013.01); *B01D 2252/20* (2013.01); *B01D 2252/2025* (2013.01); *B01D 2252/2026* (2013.01); *B01D 2252/20468* (2013.01); *B01D 2256/24* (2013.01); *B01D 2257/304* (2013.01); *C10L 2290/06* (2013.01); *C10L 2290/08* (2013.01); *C10L 2290/48* (2013.01); *C10L 2290/541* (2013.01); *C10L 2290/545* (2013.01); *Y02C 10/04* (2013.01); *Y02C 10/06* (2013.01)

(58) Field of Classification Search
CPC .......... B01D 2256/24; B01D 2257/304; B01D 53/1406; B01D 53/1425; B01D 53/1431; B01D 53/1475; B01D 53/1493; C10L 2290/06; C10L 2290/08; C10L 2290/48; C10L 2290/541; C10L 2290/545; C10L 3/103; C10L 3/104; Y02C 10/04; Y02C 10/06
See application file for complete search history.

(56) References Cited

U.S. PATENT DOCUMENTS

| | | | |
|---|---|---|---|
| 2,826,266 A | 3/1958 | Hachmuth et al. | |
| 2,863,527 A | 12/1958 | Wilhelm et al. | |
| 2,880,591 A | 4/1959 | Mooson et al. | |
| 2,926,751 A | 3/1960 | Kohl et al. | |
| 3,242,644 A | 3/1966 | Woertz et al. | |
| 3,252,269 A | 5/1966 | Woertz et al. | |
| 3,375,639 A | 4/1968 | Miller et al. | |
| 3,492,788 A | 2/1970 | Hochgesand et al. | |
| 3,505,784 A | 4/1970 | Hochgesand et al. | |
| 3,563,695 A | 2/1971 | Benson et al. | |
| 3,563,696 A | 2/1971 | Benson et al. | |
| 3,594,985 A | 7/1971 | Ameen et al. | |
| 3,714,327 A | 1/1973 | Giammarco et al. | |
| 3,773,896 A | 11/1973 | Preusser et al. | |
| 4,073,863 A | 2/1978 | Giammarco et al. | |
| 4,146,569 A | 3/1979 | Giammarco et al. | |
| 4,152,217 A | 5/1979 | Eisenberg et al. | |
| 4,271,132 A | 6/1981 | Eickmeyer | |
| 4,293,531 A | 10/1981 | Field et al. | |
| 4,372,925 A | 2/1983 | Cornelisse | |
| 4,397,660 A | 8/1983 | Van der Pas-Toornstra | |
| 4,478,799 A | 10/1984 | Bengeser et al. | |
| 4,498,911 A | 2/1985 | Deal et al. | |
| 4,533,373 A | 8/1985 | Butz et al. | |
| 4,548,620 A | 10/1985 | Albiol | |
| 5,066,314 A | 11/1991 | Leites et al. | |
| 5,137,550 A | 8/1992 | Hegarty et al. | |
| 5,411,721 A | 5/1995 | Doshi et al. | |
| 5,453,559 A | 9/1995 | Phillips et al. | |
| 5,490,873 A | 2/1996 | Behrens et al. | |
| 6,001,153 A | 12/1999 | Lebas et al. | |
| 6,071,484 A | 6/2000 | Dingman, Jr. et al. | |
| 6,139,605 A | 10/2000 | Carnell et al. | |
| 6,658,892 B2 | 12/2003 | Fanning et al. | |
| 6,800,120 B1 | 10/2004 | Won et al. | |
| 7,147,691 B2 | 12/2006 | Palmer | |
| 7,192,468 B2 | 3/2007 | Mak et al. | |
| 7,192,469 B1 | 3/2007 | Rumell et al. | |
| 7,377,967 B2 | 5/2008 | Reddy et al. | |
| 7,424,808 B2 * | 9/2008 | Mak | B01D 53/1456 423/220 |
| 7,556,671 B2 | 7/2009 | Jain et al. | |
| 7,637,987 B2 | 12/2009 | Mak | |
| 7,662,215 B2 | 2/2010 | Sparling et al. | |
| 7,879,135 B2 | 2/2011 | Ravikumar et al. | |
| 8,398,748 B2 | 3/2013 | Mak | |
| 9,295,940 B2 | 3/2016 | Mak | |
| 9,776,124 B2 | 10/2017 | Mak | |
| 9,902,914 B2 | 2/2018 | Mak | |
| 10,000,713 B2 | 6/2018 | Mak | |
| 2002/0025292 A1 * | 2/2002 | Watson | B01D 53/002 423/573.1 |
| 2005/0000360 A1 | 1/2005 | Mak et al. | |
| 2005/0172807 A1 | 8/2005 | Mak | |
| 2006/0032377 A1 | 2/2006 | Reddy et al. | |
| 2006/0110300 A1 | 5/2006 | Mak | |
| 2006/0110305 A1 | 5/2006 | Van De Graaf | |
| 2006/0150812 A1 | 7/2006 | Mak et al. | |
| 2006/0266214 A1 | 11/2006 | Won | |
| 2007/0028764 A1 | 2/2007 | Wittrup et al. | |
| 2008/0127831 A1 | 6/2008 | Rochelle et al. | |
| 2010/0000255 A1 | 1/2010 | Mak | |
| 2010/0111784 A1 | 5/2010 | Mak et al. | |
| 2011/0168019 A1 | 7/2011 | Northrop et al. | |
| 2011/0296012 A1 | 12/2011 | Scialdone | |
| 2011/0308388 A1 | 12/2011 | Bahr et al. | |
| 2012/0000359 A1 | 1/2012 | Bresler et al. | |
| 2012/0073441 A1 | 3/2012 | Mak | |
| 2012/0097027 A1 | 4/2012 | Gunther | |
| 2012/0204599 A1 | 8/2012 | Northrop et al. | |
| 2015/0166915 A1 | 6/2015 | Mak | |
| 2017/0361265 A1 | 12/2017 | Mak | |

FOREIGN PATENT DOCUMENTS

| | | |
|---|---|---|
| CN | 1627980 A | 6/2005 |
| CN | 1723073 A | 1/2006 |
| CN | 102905772 A | 1/2013 |
| EP | 0173908 A2 | 3/1986 |
| EP | 0588175 A2 | 3/1994 |
| GB | 1222199 A | 2/1971 |
| GB | 1314215 A | 4/1973 |
| JP | 57209627 | 12/1982 |
| JP | 61181515 | 8/1986 |
| JP | 2005538841 A | 12/2005 |
| JP | 2006509628 A | 3/2006 |
| JP | 2007521350 A | 8/2007 |
| JP | 2012110835 A | 6/2012 |
| JP | 5692761 B2 | 4/2015 |
| WO | WO2004026441 A1 | 4/2004 |
| WO | WO2004052511 A1 | 6/2004 |
| WO | WO2004058384 A1 | 7/2004 |
| WO | WO2005035101 A1 | 4/2005 |
| WO | WO2006118795 A1 | 11/2006 |
| WO | WO2008103467 A1 | 8/2008 |
| WO | WO2009158064 A2 | 12/2009 |
| WO | WO2010039785 A1 | 4/2010 |
| WO | WO2010111337 A1 | 9/2010 |
| WO | WO2011034993 A1 | 3/2011 |
| WO | WO2011041361 A1 | 4/2011 |
| WO | WO2011102830 A1 | 8/2011 |
| WO | WO2015089446 A1 | 6/2015 |
| WO | WO2017074323 A1 | 5/2017 |

OTHER PUBLICATIONS

PCT Application No. PCT/US2006/014710, Preliminary Report on Patentability, dated Sep. 7, 2007.
U.S. Appl. No. 11/911,789, Restriction Requirement, dated Sep. 24, 2010.
U.S. Appl. No. 11/911,789, Office Action, dated Dec. 7, 2010.
U.S. Appl. No. 11/911,789, Final Office Action, dated May 11, 2011.
U.S. Appl. No. 11/911,789, Office Action, dated Jul. 3, 2012.
U.S. Appl. No. 11/911,789, Notice of Allowance, dated Nov. 21, 2012.
U.S. Appl. No. 13/579,509, Restriction Requirement, dated Nov. 14, 2014, 10 pages.

(56) References Cited

OTHER PUBLICATIONS

U.S. Appl. No. 13/579,509, Office Action, dated Feb. 12, 2015.
U.S. Appl. No. 13/579,509, Notice of Allowance, dated Aug. 6, 2015.
U.S. Appl. No. 13/579,509, Notice of Allowance, dated Nov. 18, 2015.
International Application No. PCT/US2010/024382, International Search Report and Written Opinion, dated Apr. 16, 2010.
International Application No. PCT/US2010/024382, International Preliminary Report on Patentability, dated Aug. 14, 2012.
U.S. Appl. No. 15/697,238, Restriction Requirement, dated Jun. 14, 2016.
U.S. Appl. No. 15/697,238, Office Action, dated Oct. 31, 2016.
U.S. Appl. No. 15/697,238, Notice of Allowance, dated Feb. 17, 2017.
U.S. Appl. No. 15/697,238, Notice of Allowance, dated May 30, 2017.
U.S. Appl. No. 14/924,311, Restriction Requirement, dated Mar. 14, 2017.
U.S. Appl. No. 14/924,311, Office Action, dated Jun. 29, 2017.
U.S. Appl. No. 14/924,311, Notice of Allowance, dated Oct. 13, 2017.
PCT Application No. PCT/US15/57638, International Search Report and Written Opinion, dated Jul. 27, 2016.
U.S. Appl. No. 14/569,268, Restriction Requirement, dated Dec. 23, 2016.
U.S. Appl. No. 14/569,268, Office Action, dated May 19, 2017.
U.S. Appl. No. 14/569,268, Notice of Allowance, dated Sep. 28, 2017.
U.S. Appl. No. 14/569,268, Corrected Notice of Allowability, dated Oct. 19, 2017.
U.S. Appl. No. 14/569,268, Notice of Allowance, dated Feb. 21, 2018.
International Application No. PCT/US2014/070105, International Search Report and Written Opinion, dated Mar. 31, 2015, 11 pages.
International Application No. PCT/US2014/070105, International Preliminary Report on Patentability, dated Jun. 14, 2016, 7 pages.
Mak, John, "Configurations and Methods for Acid Gas Absorption and Solvent Regeneration," filed Apr. 29, 2005, U.S. Appl. No. 60/676,131.
Mak, John, "Configurations and Methods of Flexible CO2 Removal," filed Dec. 12, 2013, U.S. Appl. No. 61/915,173.
Restriction Requirement dated Oct. 5, 2017, U.S. Appl. No. 15/697,238, filed Sep. 6, 2017.
Office Action dated Jan. 8, 2018, U.S. Appl. No. 15/697,238, filed Sep. 6, 2017.
Final Office Action dated May 17, 2018, U.S. Appl. No. 15/697,238, filed Sep. 6, 2017.
Advisory Action dated Aug. 3, 2018, U.S. Appl. No. 15/697,238, filed Sep. 6, 2017.
Office Action dated Sep. 11, 2018, U.S. Appl. No. 15/697,238, filed Sep. 6, 2017.

* cited by examiner

CONFIGURATIONS AND METHODS OF FLEXIBLE CO2 REMOVAL

CROSS-REFERENCE TO RELATED APPLICATIONS

This application claims priority to and is a divisional of U.S. patent application Ser. No. 14/569,268 filed Dec. 12, 2014 and entitled "Configurations and Methods of Flexible CO2 Removal," which claims priority to co-pending U.S. Provisional Application No. 61/915,173, filed Dec. 12, 2013, both of which are incorporated herein in their entireties for all purposes.

FIELD OF THE INVENTION

The field of the invention is removal of acid gases from a feed gas, and particularly relates to CO2 removal of variable high CO2 content feed gas.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

Acid gas removal from various gas streams, especially removal of CO2 from natural gas streams has become an increasingly important process as the sweet gas reservoirs are being depleted and the high CO2 content fields are being developed. There are relatively large natural gas resources untapped in the world (e.g., Alaska, Continental North America, Norway, Southeast Asia, South China Sea, and Gulf of Mexico) that contain very high levels of CO2, often ranging from 15% to 60 mol %. Where CO2 is used for enhanced oil recovery (EOR), CO2 content in the fields is gradually increasing, and further field development must then include CO2 removal that can handle variable CO2 content gases.

Typically, gas plants are designed to meet pipeline gas transportation specifications on inerts, sulfur, hydrocarbons, and water dewpoint requirements and not designed to handle high CO2 content gases (e.g., 50 mol % or higher). Such processing facilities include amine treating, glycol dehydration, and hydrocarbon removal for processing low levels CO2 gases (5 mol % or less). Gas fields with high CO2 content are often considered uneconomical as technologies for high CO2 removal or variable CO2 removal are considered difficult; and consequently such high CO2 gas fields remained undeveloped. To overcome at least some of the disadvantages associated with gas production having high CO2 content, numerous CO2 removal processes have been developed which can be categorized into physical and chemical processes, wherein the choice of the appropriate gas treatment predominantly depends on the gas composition, feed gas pressure, product gas specifications and location of the plants (onshore or offshore).

For example, in one category membrane separators are used to separate acid gases from the natural gas streams using preferential diffusion of CO2 through membrane elements. A typical membrane system has a pre-treatment skid and a series of membrane modules. Membrane systems are relatively compact and simple to operate and are often used to treat low volume of high pressure CO2 gases, especially in offshore applications. However, membrane elements are prone to fouling and material degradation from gas contaminants and therefore must be monitored and periodically replaced. While initial capital outlay may be lower than with other processes, replacement costs of the membranes add up over the life of the plant. In terms of performance, single stage membrane separators are relatively non-selective and often produce a CO2 waste stream with a high hydrocarbon content, which may not meet environmental permits on greenhouse gas. Additional processing equipment may be used to improve the membrane performance (e.g., multiple stages of membrane separators with inter-stage recompression and recycle), however, such equipment will increase the cost and footprint of the system, rendering membrane separation economically unattractive.

In another category, a chemical solvent is employed that reacts with the acid gases to form a (typically non-covalent) complex. In processes involving a chemical reaction between the acid gas and the solvent, the feed gases are scrubbed with an alkaline salt solution of a weak inorganic acid (e.g., U.S. Pat. No. 3,563,695 to Benson), or with an alkaline solution of organic acids or bases (e.g., U.S. Pat. No. 2,177,068 to Hutchinson). All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply. One particular advantage of a chemical solvent system is that such systems are quite selective and typically do not absorb hydrocarbons to any significant degrees. Furthermore, the chemical solvent systems, such as promoted or activated MDEA, can produce a product gas with CO2 content in the low ppm range which is required for LNG production.

However, while use of chemical solvent (e.g. amine) systems may be advantageous, particularly in treating low CO2 content gases, there are unsurmountable difficulties when applied to treat high CO2 fields. Amine systems operate by the principle of chemical reaction equilibrium and not influenced by pressure to any significant extent. Even at high CO2 partial pressure, the CO2 rich loading does not change much. In other words, the heat required for amine regeneration is proportional to the amount of CO2 in the feed gases. Thus, as the CO2 content in the field increases, additional amine units must be added to meet sales gas specification on CO2. Even with activated or promoted tertiary amine such as MDEA, the heat requirement for solvent regeneration is significant for high CO2 content gases, which may consume significant amounts of the treated gas for heating, making such development once again uneconomical. Furthermore, the amine processes typically operate at relatively high temperature such that equipment and piping are prone to failure from corrosion and foaming problems. Still further, chemical solvent systems typically include columns, heaters, air coolers, pumps, etc., all of which require frequent monitoring and maintenance. Yet another disadvantage of amine systems is that the treated gas and CO2 streams are saturated with water, which must be dried with a drying unit to meet pipeline specifications.

In yet another category, a physical solvent can be used for removal of high CO2 content gases. Unlike amine processes, physical solvent loading capacity increases with the acid gas partial pressure according to the principle of Henry's law. This principle also favors low absorption temperature as low temperature also increases the solvent loading, hence reducing solvent circulation. High partial pressure and low operating temperature tends to favor physical solvent operation. For example, methanol processes that operate at cryogenic temperature may be employed as a low-boiling organic physical solvent, as exemplified in U.S. Pat. No. 2,863,527 to Herbert et al. However, cryogenic refrigeration is very costly, and low temperature solvent also co-absorbs a significant amount of hydrocarbons, resulting in high hydrocarbons losses. Therefore, while the methanol process is common in syngas treating, they are rarely used in natural gas plants.

Alternatively, physical solvent process can be operated at slightly below ambient temperature to minimize hydrocarbon losses. For example, the Fluor Solvent Process using propylene carbonate as physical solvent can be employed as taught in U.S. Pat. Nos. 7,192,468; 7,424,808 and 7,637,987 to Mak, J. These processes, as shown in Prior Art FIG. 1, are in many cases efficient in removal of high $CO_2$ feed gases and do not require heating as solvent regeneration is solely accomplished by flash regeneration. Mak's processes also employ the chilled flashed solvent to cool the absorber removing the $CO_2$ heat of absorption. With such efficient configurations, refrigeration requirement by the physical solvent processes can be nearly or mostly eliminated. Nevertheless, there are limitations on these processes as they require a vacuum flash stage to produce the lean solvent which is energy intensive. Moreover, where vacuum stages are omitted, non-vacuum flash stages will not produce an ultralean solvent to meet stringent $CO_2$ specifications. Such processes are acceptable as long as the $CO_2$ specification in the product gas is 2 to 3% $CO_2$, but would not meet $CO_2$ content less than 500 ppmv, which may be required in the future to meet regulations on greenhouse gas emissions. Low $CO_2$ content treated gas is also advantageous as the product can be used for blending with other high $CO_2$ gases.

Therefore, it should be appreciated that most known solvent processes lack an efficient heat exchange integration configuration, and often require significant refrigeration and/or high solvent circulation, and sometimes require heat for solvent regeneration. In most or almost all of the known physical solvent processes, either heating or the use of a vacuum flash system must be applied for solvent regeneration. Even with significant fuel and power consumption, these processes cannot fully regenerate the solvent to an ultralean level that can be used to treat high $CO_2$ feed gas to meet a low $CO_2$ specification on carbon capture.

Thus, although various configurations and methods are known to remove $CO_2$ from a feed gas, all or almost all of them suffer from one or more disadvantages. Therefore, there is still a need to provide methods and configurations for a flexible and innovative $CO_2$ removal.

SUMMARY OF THE INVENTION

The inventive subject matter provides apparatus, systems, and methods in which $H_2S$ and $CO_2$ are sequentially (and preferably selectively) removed from a hydrocarbonaceous feed gas stream. $CO_2$ is preferably removed from an $H_2S$ depleted feed gas using a semi-lean and an ultralean physical solvent to form rich and semi-lean solvents that are then regenerated in a process that produces work and refrigeration content. Most preferably, ultralean solvent is formed by dry-air stripping, and a portion of the ultralean solvent is combined with the $H_2S$ depleted feed gas upstream of an absorber.

In one aspect of the inventive subject matter, the inventor contemplates a method of removing acid gases from a hydrocarbonaceous feed gas containing $H_2S$ and $CO_2$ in which $H_2S$ is preferentially (and more typically selectively) removed from the feed gas to so form an $H_2S$ depleted feed gas. $CO_2$ is then removed from the $H_2S$ depleted feed gas using a first and a second absorber by a semi-lean and an ultralean solvent, respectively, to so form a product gas (preferably with a $CO_2$ content of 500 ppmv to 0.5 mol % $CO_2$), a rich solvent, and the semi-lean solvent. Pressure of the rich solvent is then reduced to generate work, a cooled flashed solvent, a $CO_2$ stream, and refrigeration, and the cooled flashed solvent is employed to cool the $H_2S$ depleted feed gas and the semi-lean solvent. Finally, the flashed solvent is stripped with dried air (preferably at about atmospheric pressure, having a water dew point of equal or less than 40° F.) to produce the ultralean solvent, and a portion of the ultralean solvent is combined with the $H_2S$ depleted feed gas, preferably before entry into the first or second absorber.

Most typically, the hydrocarbonaceous feed gas has a pressure of at least 300 psig and comprises at least 5 (and more typically at least 20) mol % $CO_2$. Where desirable, it is contemplated that the first and a second absorbers are combined into a single column having a first and second absorber section. It is further preferred that the solvent is a physical solvent, and most preferably propylene carbonate, tributyl phosphate, normal methyl pyrrolidone, a dimethyl ether of polyethylene glycol, and/or polyethylene glycol dialkyl ether.

In further contemplated methods, the step of selectively removing $H_2S$ is performed via solvent absorption with an $H_2S$ selective solvent or adsorption of $H_2S$ to a solid adsorbent. While not limiting to the inventive subject matter, it is also contemplated that the semi-lean solvent is produced from the second absorber and is cooled to a temperature ranging from 20° F. to −20° F., and/or that the rich solvent is produced from the first absorber and is flashed to at least two separators operating in series. So formed recycle streams are then compressed and recycled back to the absorber or $H_2S$ depleted feed gas. It is further contemplated that the majority (e.g., at least 70%, or at least 85%) of the $CO_2$ content in the rich solvent is removed from the solvent at atmospheric pressure, that the first absorber is operated to have a temperature of about 30° F. to about −10° F. at a bottom section, and/or that the ultralean solvent and the semi-lean solvent have a temperature ranging from 10° F. to −25° F.

Consequently, the inventors also contemplate a plant for acid gas removal from a hydrocarbonaceous feed gas, typically comprising at least 20 mol % $CO_2$. Especially contemplated plants are fluidly coupled to a feed gas source that provides a hydrocarbonaceous feed gas comprising $H_2S$ and $CO_2$ at a pressure of at least 300 psig. An $H_2S$ removal unit then selectively removes $H_2S$ from the feed gas to produce an $H_2S$ depleted feed gas, and a first and a second absorber are fluidly coupled in series to the $H_2S$ removal unit and remove $CO_2$ from the $H_2S$ depleted feed gas using a semi-lean generated from the second absorber and an ultralean solvent generated from the stripping section, respectively, and thereby produce a product gas (preferably having $CO_2$ content of 500 ppmv to 0.5 mol % $CO_2$), and a rich solvent. A plurality of pressure reduction stages subsequently receive and reduce pressure of the rich solvent to generate work, a $CO_2$ stream, and a cooled flashed solvent, and first and second heat exchangers use the cooled flashed solvent to cool the $H_2S$ depleted feed gas and the semi-lean solvent. Finally, a stripping unit strips the flashed solvent with dried air (preferably having a water dew point of equal or less than -40° F.) to produce the ultralean solvent, and a conduit is installed to combine a portion of the ultralean solvent with the H2S depleted feed gas. As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Most preferably, the solvent is a physical solvent (e.g., propylene carbonate, tributyl phosphate, normal methyl pyrrolidone, a dimethyl ether of polyethylene glycol, and/or polyethylene glycol dialkyl ethers), and the H2S removal unit removes H2S using a H2S selective solvent or a sulfur scavenger adsorbent. In is also contemplated that the plurality of pressure reduction stages is configured such that at least 85% of the CO2 content in the rich solvent is removed from the solvent at atmospheric pressure.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

Prior Art

DETAILED DESCRIPTION

Figure 1:
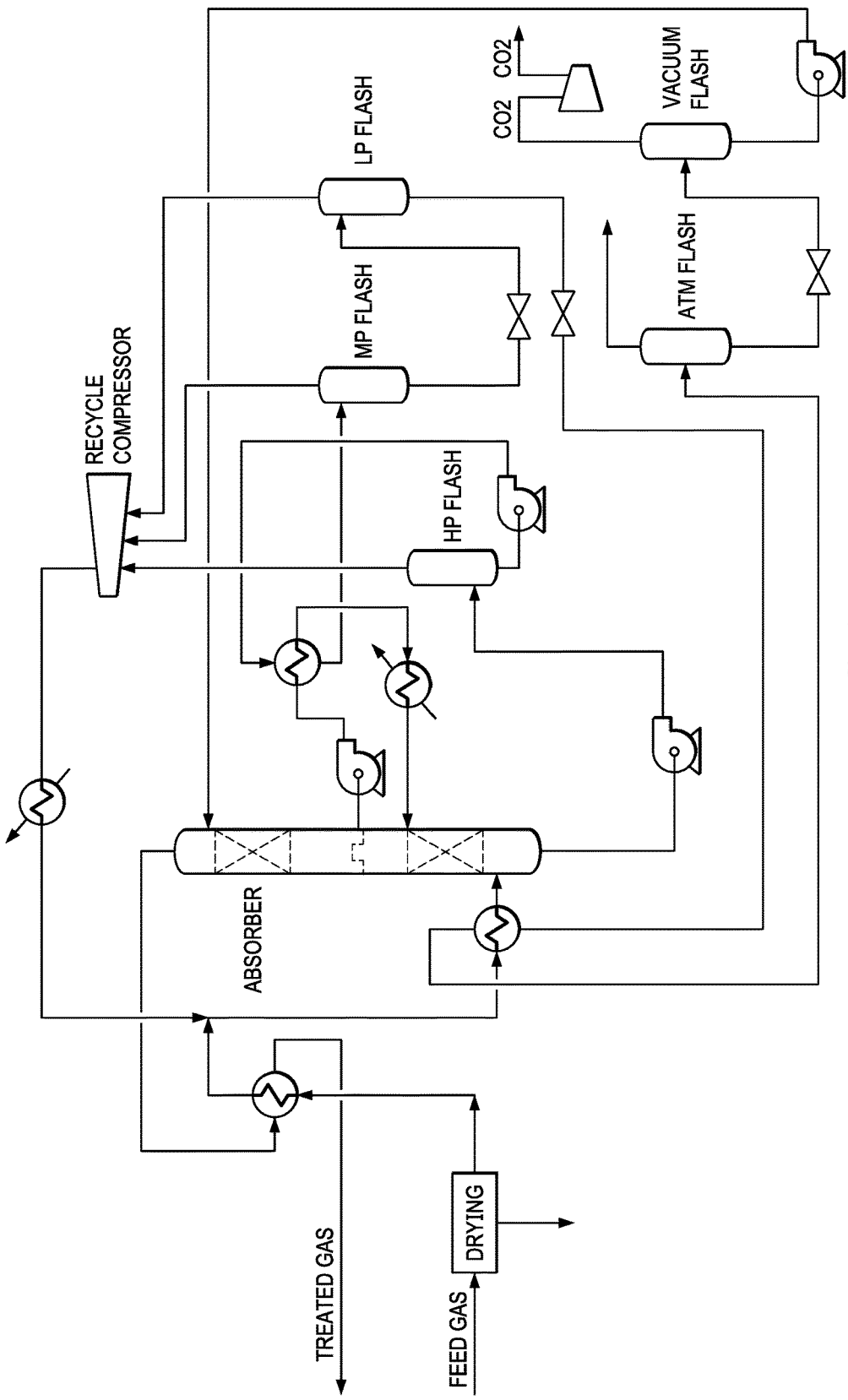
FIG. 1 is a schematic depicting an exemplary configuration for CO2 removal using a physical solvent in a known process.

The inventor has discovered that acid gases, and predominately CO2, can be removed in a conceptually simple and effective manner to meet stringent CO2 specification of 500 ppmv to 0.5 mol % from a feed gas that contains H2S and variable CO2 content ranging from 5 mol % to 60 mol % CO2 at pressures ranging from 300 psig to 1100 psig, or even higher.

In especially preferred methods, H2S is preferentially, and more typically selectively removed from the feed gas prior to CO2 removal that is carried out in one or more absorbers. Deep solvent regeneration is achieved in an economic manner by dry air stripping, which will allow the circulating solvents to remain in a dry state. Such regeneration and solvent chilling (e.g., to −15 ° F. to −25 ° F.) in combination with sequential acid gas removal is particularly effective to maximize solvent loading and to minimize solvent circulation, and to allow use of the same plant to treat varying concentrations of CO2 in the feed gases, while producing a dry CO2 stream can be compressed for reinjection for CO2 sequestration.

Especially preferred H2S removal units will be located upstream of the first absorber and uses most preferably an H2S specific process. There are various H2S removal methods known in the art, and all of those are generally deemed suitable for use. However, especially preferred H2S removal units include those that have at least a preference (e.g., at least more than equal co-absorption at equimolar presence of H2S and CO2), and more typically high selectivity to H2S over CO2. For example, H2S selective H2S removal systems include those based on H2S selective membranes, adsorptive processes, alkanolamine processes taking into consideration the differential mass transfer resistance, differential reaction rates with the alkanoamine, and/or chemical/physical equilibria of H2S and CO2 in solution, etc. Thus, suitable processes include the LO-CAT® process (wet scrubbing, liquid redox system that uses a chelated iron solution, Merichem Company, Houston Tex.), the FLEX-SORB® process (sterically hindered amine solvent, Exxon Mobil Corporation, Irving Tex.), SULFUROX™, or various molecular sieve or other solid phase bed adsorbents.

With respect to the absorbers in contemplated plants it is generally preferred that the absorber stage comprises two or more absorbers operating in series, with the H2S depleted feed gas being fed to the first absorber that uses a chilled semi-lean solvent produced by the second absorber for CO2 removal. The second absorber uses an ultralean solvent produced from an air stripper (preferably operating at about atmospheric pressure) to remove residual CO2 from overhead vapor from the first absorber. It is further preferred that the rich solvent is expanded, preferably using hydraulic turbines, to produce a chilled rich solvent that can then be used for cooling the feed gas and semi-lean solvent. As will be readily appreciated, the expansion or pressure letdown may occur in several (e.g., at least three) steps, producing at least one or two recycle streams that are then compressed and fed back to the first absorber or H2S depleted feed gas while the third (or subsequent) flash step produces a CO2 rich product stream at about atmospheric pressure. As used herein, the term "about" in conjunction with a numeral refers to a range of +/−10% of that numeral, inclusive. For example, where a system has a pressure of about 1,000 psig, the range refers to pressures between 900-1,100 psig. Thus, and unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

Most typically, and as further explained in more detail below, a dry air stripper is used for solvent regeneration, and is preferably integrated with the two stage absorption system using solvent flashing for cooling. In this context, it should be noted that the dry air is used to remove both, residual water and residual CO2 from the solvent from the atmospheric stage to so produce an ultralean solvent that is then used in the second absorber. Dry air stripping can advantageously produce an ultralean solvent with very low water content (e.g., having water dew point of −40° F. and very low CO2 content, typically below 0.1 mol % and most typically below 0.05 mol %). To optimize absorption, the ultralean solvent is typically maintained at temperatures between about −15 ° F. to −30 ° F., with most, if not all of the refrigeration generated from expansion of process streams (preferably rich solvent).

Among other advantages of contemplated configurations, it should be recognized that the processes according to the inventive subject matter are generally non-corrosive due to operation at low temperature and absence (or very low quantities) of water in the physical solvent. In contrast, conventional amine units for carbon dioxide removal are generally more complex to operate and maintain as such processes tend to be corrosive and often require antifoam and anti-corrosion injections during operation. Still further, another advantage of contemplated physical solvent processes contemplated herein is that, unlike amine processes, the solvent circulation rate is less sensitive to increases in $CO_2$ partial pressure as the $CO_2$ loading in the rich solvent merely increases with increasing $CO_2$ concentration in the feed gas. In an amine unit design, the amine circulation rate would need to be increased linearly with increasing carbon dioxide content. Moreover, contemplated physical solvent processes are generally resistant to freezing (especially compared to known amine treating processes), thus requiring less supporting offsite/utility systems such as steam boilers. Indeed, systems and methods receiving a high $CO_2$ feed gas may not require any cooling duty as the flashing of $CO_2$ from the rich solvent will provide the necessary cooling for regeneration.

Figure 2:
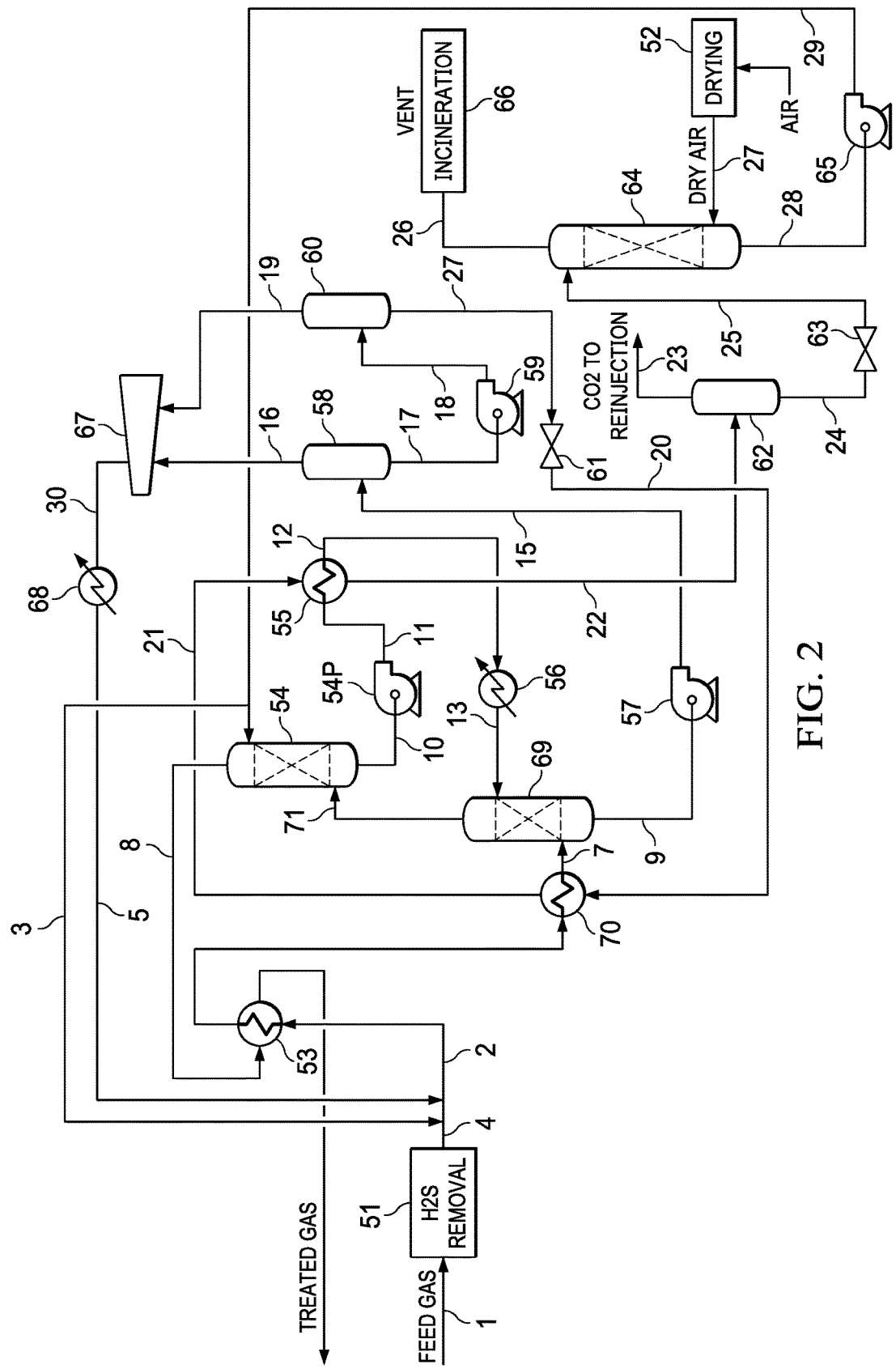
FIG. 2 is one exemplary schematic depicting a plant configuration for CO2 removal using two absorber stages according to the inventive subject matter.

For example, a contemplated configuration for an acid gas removal plant is depicted in FIG. 2, where an exemplary plant includes an H2S removal unit 51 and air dehydration unit 52, producing an H2S depleted feed gas 4 from hydrocarbonaceous feed gas 1, and a dry air stream 27 from (typically ambient) air, respectively. Preferably, and as already noted above, the H2S removal unit may include a solid adsorbent (e.g., iron oxide absorbent), a unit for redox processes, sulfur scavenger beds, an amine-based (e.g., MDEA) absorption process, or a sterically hindered amine adsorption processes. Viewed from another perspective, it is generally preferred that the H2S removal unit removes H2S with minimum $CO_2$ co-absorption (i. e., with specificity towards H2S as compared to $CO_2$). It should be particularly noted that a separation of (upstream) H2S removal from (downstream) $CO_2$ removal is counter to ordinary practice in the art as it is generally deemed advantageous to remove both acid gases using the same solvent system to so minimize pumping and solvent regeneration devices and expenses. However, the inventor has now recognized that separation of the two removal processes produces a H2S-free $CO_2$ stream that can be used for $CO_2$ sequestration while minimizing energy consumption of the H2S removal unit by maximizing the $CO_2$ content to the $CO_2$ removal unit, which advantageously utilizes the $CO_2$ content for refrigeration, such that the production of a low $CO_2$ product stream can be achieved at lower energy costs. Such energy reduction is at least in part due to the low solvent temperature and air stripping. As will be appreciated, the air drying unit for the air stripper may use cooling by refrigeration, ethylene glycol dehydration, silica gel, or other desiccant bed processes commonly used for instrument air.

H2S depleted feed gas stream 4 is combined with a slip stream of the ultralean solvent 3 (hydrate prevention option), and recycle gas stream 5, forming two-phase stream 2 at about 100° F., and the two-phase stream is cooled by product gas stream 8 in exchanger 53 to about 75 ° F., which is further cooled by the flashed solvent stream 20 in exchanger 70 to about 35 ° F. (or slightly above [e.g., 1-5° F. above] the gas hydrocarbon dew-point temperature). The chilled gas stream 7 enters the first absorber 69. It should be particularly appreciated that the use of ultralean solvent mixing with the treated gas depresses the water dewpoint of the treated gas, allowing cooling the feed gas to be cooled to a relatively low temperature while avoiding hydrate formation that may cause equipment blockage.

With respect to the $CO_2$ content in the feed gas, it is contemplated that the systems and methods presented herein are generally suitable for a wide range of $CO_2$ content while producing a product gas with low residual acid gas content (e.g., at or below 0.5 mol %, or at or below 500 ppmv). Therefore, the solvent unit in most typical systems and methods can be used to treat a hydrocarbonaceous feed gas having a variable $CO_2$ content of between about 5 mol % to about 60 mol % $CO_2$. Therefore, contemplated systems and methods can be used in gas processing plants that are required to treat variable $CO_2$ content gases without further modification to accommodate changes in $CO_2$ content. Furthermore, it should be recognized that the pressure of contemplated feed gases may vary considerably, but will in some cases be at least 300 psig, in other cases at least 600 psig, in further cases typically at least 1200 psig, and in still other cases at least 1500 psig. Moreover, while it is generally contemplated that at least a portion of the feed gas pressure is due to the pressure of the gas contained in a well, it should also be recognized that where appropriate, the pressure may be increased using one or more compressors.

Consequently, and with respect to suitable feed gases it is contemplated that various natural and synthetic feed gases are appropriate. However, particularly preferred feed gases include natural gas, and especially natural gas with $CO_2$ content that is at least about 5 mol %, more typically 10 mol %, even more typically 20 mol %, and most typically 40 mol % or even higher. Therefore, especially suitable feed streams include natural gas feed streams from oil and gas fields from Alaska, Norway, Southeast Asia, South China Sea and Gulf of Mexico.

It is further preferred that the first absorber uses semi-lean solvent 10 from the second absorber 54 that is pumped by pump 54P forming stream 11, which is cooled with the chilled flashed solvent 21 in exchanger 55 to about 10° F. to −20 ° F. forming stream 12. Stream 12 may further be chilled (optional) using refrigeration chiller 56 forming stream 13 at about 10° F. to −25° F. before being fed to the first absorber. It should be appreciated that high $CO_2$ feed gases (e.g., 30 mol % to 60 mol %) do not require external refrigeration as chilling from $CO_2$ flashing will provide sufficient cooling. In contrast, with low $CO_2$ feed gas (5 mol %) the amount of $CO_2$ flashing is reduced and typically not sufficient to cool the absorber, which then necessitates external refrigeration.

With respect to solvents employed in contemplated absorbers, particularly preferred solvents include propylene carbonate (or other solvent with similar properties) that allows the processes to operate at −20° F. or lower with low operating costs and capital costs. With such or similar solvent, the process can achieve low solvent circulation, low methane absorption, low energy consumption, and requires no water makeup, while allowing plant construction using carbon steel material. Thus, in most aspects of the inventive subject matter, suitable solvents are non-aqueous solvents that will comprise minimal to no water (e.g., equal or less than 1 wt %, preferably equal or less than 0.5 wt %, more preferably equal or less than 0.11 wt %.), such that a dry $CO_2$ gas can be produced suitable for $CO_2$ sequestration. However, there are numerous physical solvents known in the art that may also be applicable and exemplary preferred physical solvents include tributyl phosphate, normal methyl pyrrolidone, dimethyl ether of polyethylene glycol, and/or various polyethylene glycol dialkyl ethers. Alternatively, other solvents including enhanced tertiary amine (e.g., Piperazine) or other solvent may be employed having similar behavior as physical solvent. Contemplated methods and configurations use a physical solvent (preferably propylene carbonate) which can be regenerated without heating process (without fuel gas consumption) and which can produce a low $CO_2$ content product gas (500 ppmv).

The first absorber 69 produces an overhead vapor stream 71 with partially removed $CO_2$ and a rich solvent bottom stream 9, having a temperature of about 10 ° F. to 40 ° F. The overhead vapor is routed to the bottom of the second absorber 54 that uses ultralean solvent stream 29 at about −20° F. to produce a product gas stream 8 containing 500 ppm to 0.5 mol % $CO_2$. It should be recognized that physical solvent performance improves with low operating temperatures. In this example, it should be noted that the low limit of about −20° F. is selected because of the favorable physical property characteristics (especially low surface tension and low viscosity) for heat and mass transfer in exchangers and separation equipment.

It is especially preferred that the cooling duty in the exchanger 55 is supplied by the solvent stream 21 which is chilled from work extracted in hydraulic turbines 57 and 59 and the heat of $CO_2$ desorption in separator 58 and 60. However, it should be recognized that cooling may also be provided by other streams, produced internally or externally within the plant, such as using the JT valve 61, and/or the use of propane refrigeration. It should also be appreciated that the pressure of the letdown stream to JT valve 61 is optimally controlled to avoid over-cooling of the solvent. In general, it is preferred that the temperature of stream 20 be maintained at an acceptably low temperature as high solvent viscosity and surface tension due to low temperatures can adversely impact the performance of heat and mass transfer in heat exchangers and contactors.

The rich solvent stream 9 from the first absorber is letdown in pressure in hydraulic turbine 57, reducing pressure to typically about ⅓ to ½ of the feed gas pressure, which cools the rich solvent to about 15° F. It is generally contemplated that the hydraulic turbine is an energy efficient device as it produces shaft work to operate the circulation pump while at the same time generating refrigeration. It should be appreciated that shaft work and cooling increases with $CO_2$ content in the feed gas, and with sufficiently high $CO_2$ content (60%), the hydraulic turbines can support the power consumption of the circulation pump as well as the refrigeration requirement. Such solvent configuration is an extremely energy efficient process.

The two phase stream 15 is flashed to separator 58, which produces a first flashed vapor stream 16 containing methane and $CO_2$ and is compressed by recycle gas compressor 67. The compressed gas stream 30 is cooled by ambient air in exchanger 68 to about 100° F. forming stream 5 that is recycled back to the absorber section. The flashed liquid stream 17 is expanded in a second hydraulic turbine 59 to a pressure reduced by at least half to form an expanded rich solvent stream 18, at about −10° F., which is further separated in separator 60 producing vapor stream 19 and liquid stream 27. The flash vapor stream 19 is compressed together with stream 16 and recycled back to the absorber section. It should be appreciated that high methane recovery (e.g., 99% or higher) can be achieved by further lowering the pressure in separator 60. However, high methane recovery must be justified against the expenses of higher power consumption by the recycle gas compressor, which should be evaluated on a case by case basis.

Liquid stream 27 from the second separator is further letdown in pressure using JT valve 61, which lowers the solvent temperature such that it can be used to cool feed gas in exchanger 70 and semi-lean solvent in exchanger 55. The $CO_2$ rich solvent from exchanger 55 is heated to about 10 to −15° F. to form stream 22 that is flashed to the separator 62 at about atmospheric pressure, producing $CO_2$ rich stream 23 and a flashed liquid stream 24. The $CO_2$ stream 23 contains over 95% $CO_2$ which can be further compressed for reinjection and enhanced oil recovery for $CO_2$ sequestration, or further purified to produce a $CO_2$ product for chemical manufacturing or food grade $CO_2$.

The flashed solvent stream 24 is routed via valve 63 as stream 25 to stripper 64 using dry air 27 as the stripping medium. Dry air stripping is energy efficient as it can maintain a water balance of the unit by removing almost all the water content in the lean solvent as well as residual $CO_2$, producing a dry and ultralean solvent 28 that can be used to dry and treat the feed gas to meet very low $CO_2$ specification (500 ppmv). It should also be noted that the air stripping operation also lowers the solvent temperature as residual $CO_2$, hydrocarbons and water are flashed off producing more refrigeration. The ultralean solvent is pumped by pump 65 forming stream 29, a portion of which is returned to the second absorber 54. The air stripper overhead stream 26 contains residual $CO_2$, water, and minimal hydrocarbons that can be sent to incineration unit 66 or waste heat recovery. It should be noted that the hydrocarbon content in stream 26 provides heating values that is required for the incineration process.

It should also be appreciated that dry air stripping will become a feasible option in most circumstances only by removal of $H_2S$ from the hydrocarbonaceous feed gas prior to removal of $CO_2$. Heretofore known processes without upstream $H_2S$ removal cannot use air for solvent regeneration under all or almost all circumstances as air would react with $H_2S$ in the rich solvent, resulting in sulfur deposition and various equipment plugging problems. Moreover, dry stripping also allows reduction of the residual water content in the regenerated solvent, which in turn enables very low temperature operation (e.g., less than −10° F., more typically less than −15° F., most typically less than −20° F.) of the solvent, thereby reducing solvent circulation rate and increasing energy and absorption efficiency.

Figure 3:
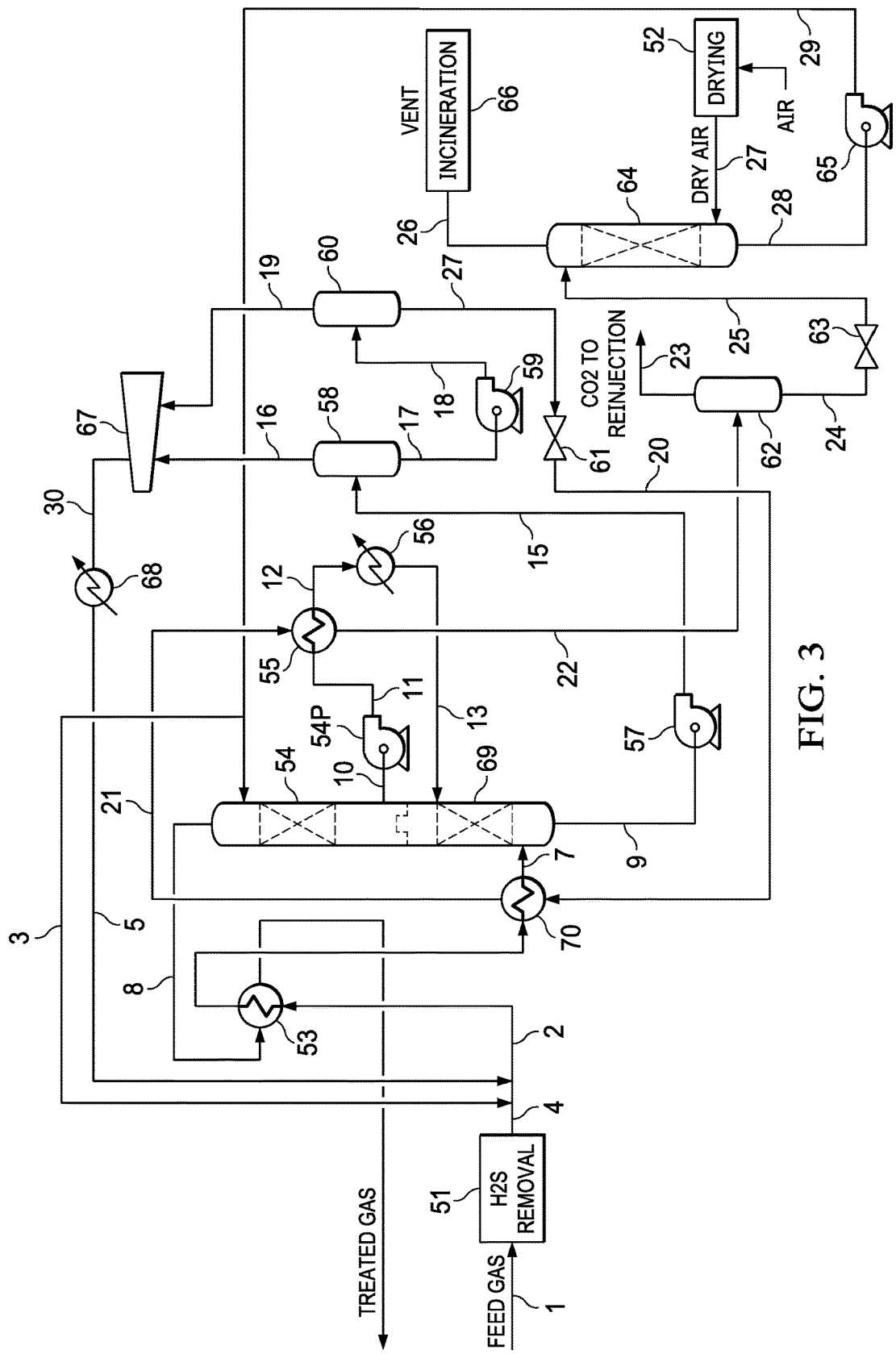
FIG. 3 is another exemplary schematic depicting a plant configuration for CO2 removal using one single absorber with two absorption stages according to the inventive subject matter.

FIG. 3 exemplarily depicts another schematic plant configuration for $CO_2$ removal in which the two absorber vessels are integrated into a single absorber tower to so preserve plot space. Here, the individual absorber vessels are configured as absorber sections operating substantially at the same pressure, and are separated from each other via a chimney tray or other suitable element that permits upwards gas flow while preventing direct flow of liquid from the upper section to the lower section. With respect to the components in FIG. 3 as compared to those in FIG. 2, it should be noted that the same numerals indicate the same components, and that all considerations for the components of FIG. 2 also apply to the corresponding components in FIG. 3.

An exemplary overall mass balance for contemplated methods and configuration for a high $CO_2$ content feed gas (here: 55.6 mol %) at a pressure of about 1100 psig is shown in Table 1. The product gas is a dry gas that meets pipeline gas specification with maximum $CO_2$ content of 0.5 mol %. For more stringent $CO_2$ specifications, the $CO_2$ content can be further reduced to about 500 ppmv with additional air stripping and circulation.

TABLE 1

| Stream | Feed | Dry Feed | Treated Gas | CO2 | Dry Air | Vent |
|---|---|---|---|---|---|---|
| Mole Fraction | | | | | | |
| N2 | 0.071 | 0.071 | 0.161 | 0.000 | 0.790 | 0.412 |
| O2 | — | — | 0.000 | — | 0.210 | 0.109 |
| CO2 | 0.556 | 0.557 | 0.005 | 0.991 | — | 0.475 |
| H2S | 4 ppm | — | — | — | — | — |
| CH4 | 0.362 | 0.363 | 0.819 | 0.003 | — | 0.000 |
| C2H6 | 0.006 | 0.006 | 0.012 | 0.001 | — | 0.000 |
| C3H8 | 0.002 | 0.002 | 0.002 | 0.002 | — | 0.000 |
| IC4 | 0.000 | 0.000 | 0.000 | 0.000 | — | 0.000 |
| NC4 | 0.001 | 0.001 | 0.000 | 0.001 | — | 0.001 |
| IC5 | — | — | — | — | — | — |
| NC5 | 0.000 | 0.000 | 0.000 | 0.000 | — | 0.000 |
| C6+ | 0.001 | 0.001 | 0.000 | 0.001 | — | 0.001 |
| H2O | 0.001 | 0.000 | 0.000 | 0.000 | — | 0.003 |
| Temperature, | 104.0 | 104.0 | 82.0 | −8.9 | 100.0 | −14.5 |
| Pressure, psig | 1,102.3 | 1,099.3 | 1,075.0 | 5.0 | 5.0 | 1.0 |
| Flow, MMscfd | 101 | 101 | 44 | 52 | 5 | 9 |

An exemplary overall mass balance for contemplated methods and configuration for a intermediate CO2 content feed gas (here: 32 mol %) at a pressure of about 1100 psig is shown in Table 2. The product gas is a dry gas that meets pipeline gas specification with maximum CO2 content of 0.5 mol %. Once more, for more stringent CO2 specifications, CO2 content can be further reduced to about 500 ppmv with additional air stripping and circulation.

TABLE 2

| Stream | Feed | Dry Feed | Treated Gas | CO2 | Dry Air | Vent |
|---|---|---|---|---|---|---|
| Mole Fraction | | | | | | |
| N2 | 0.077 | 0.077 | 0.114 | 0.000 | 0.790 | 0.361 |
| O2 | — | — | 0.000 | — | 0.210 | 0.096 |
| CO2 | 0.319 | 0.319 | 0.005 | 0.979 | — | 0.533 |
| H2S | 4 ppm | — | — | — | — | — |
| CH4 | 0.585 | 0.586 | 0.862 | 0.005 | — | 0.000 |
| C2H6 | 0.011 | 0.011 | 0.015 | 0.003 | — | 0.000 |
| C3H8 | 0.003 | 0.003 | 0.003 | 0.003 | — | 0.001 |
| IC4 | 0.001 | 0.001 | 0.000 | 0.001 | — | 0.001 |
| NC4 | 0.001 | 0.001 | 0.000 | 0.001 | — | 0.001 |
| IC5 | 0.000 | 0.000 | 0.000 | 0.001 | — | 0.001 |
| NC5 | 0.000 | 0.000 | 0.000 | 0.000 | — | 0.000 |
| C6+ | 0.003 | 0.003 | 0.001 | 0.005 | — | 0.006 |
| H2O | 0.001 | 0.000 | 0.000 | 0.000 | — | 0.003 |
| Temperature, ° F. | 104.0 | 104.0 | 82.0 | −13.1 | 100.0 | −18.6 |
| Pressure, psig | 1,102.3 | 1,099.3 | 1,075.0 | 5.0 | 5.0 | 1.0 |
| Flow, MMscfd | 101 | 101 | 69 | 28 | 4 | 8 |

An exemplary overall mass balance for contemplated methods and configuration for a intermediate CO2 content feed gas (here: 5.7 mol %) at a pressure of about 565 psig is shown in Table 3. The product gas is a dry gas that meets pipeline gas specification with maximum CO2 content of 0.5 mol %. As already noted before and where desired, for more stringent CO2 specifications, CO2 content can be further reduced to about 500 ppmv with additional air stripping and circulation.

TABLE 3

| Stream | Feed | Dry Feed | Treated Gas | CO2 | Dry Air | Vent |
|---|---|---|---|---|---|---|
| Mole Fraction | | | | | | |
| N2 | 0.076 | 0.077 | 0.081 | 0.000 | 0.790 | 0.537 |
| O2 | — | — | 0.000 | — | 0.210 | 0.143 |
| CO2 | 0.057 | 0.058 | 0.005 | 0.769 | — | 0.278 |
| H2S | — | — | — | — | — | — |
| CH4 | 0.820 | 0.822 | 0.876 | 0.070 | — | 0.001 |
| C2H6 | 0.027 | 0.027 | 0.027 | 0.054 | — | 0.003 |
| C3H8 | 0.010 | 0.010 | 0.009 | 0.058 | — | 0.010 |
| IC4 | 0.002 | 0.002 | 0.001 | 0.018 | — | 0.006 |

TABLE 3-continued

| Stream | Feed | Dry Feed | Treated Gas | CO2 | Dry Air | Vent |
|---|---|---|---|---|---|---|
| NC4 | 0.002 | 0.002 | 0.001 | 0.018 | — | 0.009 |
| IC5 | 0.001 | 0.001 | 0.000 | 0.006 | — | 0.005 |
| NC5 | 0.000 | 0.001 | 0.000 | 0.003 | — | 0.003 |
| C6+ | 0.001 | 0.001 | 0.000 | 0.004 | — | 0.004 |
| H2O | 0.001 | 0.000 | 0.000 | 0.000 | — | 0.003 |
| Temperature, ° F. | 78.8 | 78.8 | 68.0 | −14.9 | 100.0 | −21.2 |
| Pressure, psia | 565.5 | 562.5 | 548.0 | 5.0 | 5.0 | 1.0 |
| Flow, MMscfd | 101.0 | 100.8 | 95.6 | 1.9 | 7.3 | 10.7 |

It should be appreciated that selective removal of H2S upstream of CO2 removal is particularly beneficial as it maximizes the CO2 to the solvent unit, avoids the common problems of sulfur deposition in the stripper when air is used for stripping, and produces a sulfur free CO2 for sequestration. It should also be appreciated that dry air stripping has several additional advantages. First, dry air is readily available and inexpensive. Second air stripping can produce an ultralean solvent for treating to meet a very low CO2 specification (500 ppmv or even lower) in the product gas. Third, dry air stripping removes the moisture content in the lean solvent, allowing the unit to operate at a low temperature. Forth, air stripping will lower the solvent temperature as the residual CO2 content and hydrocarbons are desorbed. The ultralean solvent increases the CO2 pickup in the absorber while the low solvent temperature reduces the absorber temperature, both of which effectively reduce the solvent circulation. There, it should be noted that performance of the methods and configuration is superior to heretofore known configurations and methods that all use vacuum flash for regeneration.

Moreover, it should also be appreciated that the thusly flashed CO2 product stream is a dry stream and contains over 95 mol % CO2, which is sulfur free suitable for enhanced oil recovery without further need of processing. If necessary or desired, higher purity CO2 and/or higher methane recovery (99.5% or higher) can be achieved by increasing the temperatures and/or reducing the pressures of the flash separators and increasing the recycle flow rates.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc. Moreover, and as used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

What is claimed is:

1. A plant comprising:
a feed gas source that is configured to provide a hydrocarbonaceous feed gas comprising H2S and CO2 at a pressure of at least 300 psig;
a H2S removal unit configured to selectively remove H2S from the hydrocarbonaceous feed gas to produce a H2S depleted feed gas;
a first absorber and a second absorber fluidly coupled in series and configured to remove CO2 from the H2S depleted feed gas using a semi-lean and an ultralean solvent, respectively, thereby producing a product gas and a rich solvent;
a plurality of pressure reduction stages configured to receive and reduce pressure of the rich solvent to thereby generate work, a CO2 stream, and a cooled flashed solvent;
a first heat exchanger and a second heat exchanger configured to use the cooled flashed solvent to cool the H2S depleted feed gas and the semi-lean solvent;
a stripping unit configured to strip the flashed solvent with dried air to thereby produce the ultralean solvent; and
a conduit configured to combine a portion of the ultralean solvent with the H2S depleted feed gas.

2. The plant of claim 1, wherein the solvent is a physical solvent selected from the group consisting of propylene carbonate, tributyl phosphate, normal methyl pyrrolidone, a dimethyl ether of polyethylene glycol, and a polyethylene glycol dialkyl ether.

3. The plant of claim 1, wherein the H2S removal unit is configured to remove H2S using a H2S selective solvent or a solid phase adsorbent.

4. The plant of claim 1, wherein the hydrocarbonaceous feed gas comprises at least 20 mol % CO2.

5. The plant of claim 1, wherein the dried air has a water dew point of equal or less than −40° F.

6. The plant of claim 1, wherein the product gas has a CO2 content of 500 ppmv to 0.5 mol % CO2, and the CO2 stream is a dry H2S-free gas suitable for CO2 sequestration.

7. The plant of claim 1, wherein the plurality of pressure reduction stages is configured such that at least 85% of the CO2 content in the rich solvent is removed from the solvent at atmospheric pressure.

8. The plant of claim 1, wherein the first absorber and the second absorber are formed in a single vessel having a first absorber section and a second absorber section.

9. A plant comprising:
a feed gas source that is configured to provide a hydrocarbonaceous feed gas comprising H2S and CO2;
a H2S removal unit configured to receive the hydrocarbonaceous feed gas and selectively remove H2S from the hydrocarbonaceous feed gas to produce a H2S depleted feed gas;

a first absorber and a second absorber fluidly coupled in series and configured to remove CO2 from the H2S depleted feed gas using a semi-lean and an ultralean solvent, respectively, thereby producing a product gas and a rich solvent;

a plurality of pressure reduction stages configured to receive and reduce a pressure of the rich solvent to thereby generate work, a CO2 stream, and a cooled flashed solvent;

a first heat exchanger configured to use the cooled flashed solvent to cool the H2S depleted feed gas;

a second heat exchanger configured to use the cooled flashed solvent to cool the semi-lean solvent;

a stripping unit configured to strip the flashed solvent with dried air to thereby produce the ultralean solvent; and a conduit configured to combine a portion of the ultralean solvent with the H2S depleted feed gas between the H2S removal unit and the first heat exchanger.

10. The plant of claim 9, wherein the solvent is a physical solvent selected from the group consisting of propylene carbonate, tributyl phosphate, normal methyl pyrrolidone, a dimethyl ether of polyethylene glycol, and a polyethylene glycol dialkyl ether.

11. The plant of claim 9, wherein the H2S removal unit is configured to remove H2S using a H2S selective solvent or a solid phase adsorbent.

12. The plant of claim 9, further comprising a hydraulic turbine configured to receive the rich solvent and generate the work.

13. The plant of claim 9, wherein the dried air has a water dew point of equal or less than −40° F.

14. The plant of claim 9, wherein the product gas has a CO2 content of 500 ppmv to 0.5 mol % CO2.

15. The plant of claim 9, wherein the plurality of pressure reduction stages is configured such that at least 85% of the CO2 content in the rich solvent is removed from the rich solvent at atmospheric pressure.

16. The plant of claim 9, wherein the first absorber and the second absorber are formed in a single vessel having a first absorber section and a second absorber section.

17. The plant of claim 9, wherein the second absorber is configured to receive at least a portion of the ultra-lean solvent and produce the semi-lean solvent due to absorption of CO2 in the ultra-lean solvent.

18. The plant of claim 9, wherein the first heat exchanger is configured to cool the H2S depleted feed gas upstream of the first absorber using the cooled flashed solvent, and wherein the second heat exchanger is configured to cool the semi-lean solvent from the second absorber between the second absorber and the first absorber.

19. The plant of claim 9, further comprising:
a third heat exchanger configured to cool the H2S depleted feed gas upstream of the first absorber using the product gas.

20. The plant of claim 9, further comprising:
a pressure reduction valve configured to reduce the pressure of the cooled flashed solvent and cool the cooled flashed solvent.

* * * * *